3,393,164
FILLED ORGANOSILOXANE ELASTOMERS NOT SUBJECT TO CREPE-HARDENING
David B. Braun, Clarence, N.Y., assignor to Union Carbide Corporation, a corporation of New York
No Drawing. Filed Sept. 23, 1964, Ser. No. 398,795
8 Claims. (Cl. 260—18)

This invention relates to organosiloxane elastomer formulations and to the cured elastomers produced therefrom. More particularly, the invention is directed to improved organopolysiloxane elastomer formulations which contain nonionic or cationic surfactants.

Heretofore, conventional peroxide curable organopolysiloxane elastomer formulations have been subject to the undesirable phenomenon known as "crepe-hardening." Crepe-hardening has been substantially reduced by including in the elastomer formulations organosilicon compounds containing silicon-bonded hydroxy groups and/or alkoxy groups. However, the tensile strength of the final cured elastomer containing hydroxy or alkoxy silicon compounds was not as high as would frequently be desirable.

Heretofore, in the so-called room temperature vulcanizable (RTV) organopolysiloxane elastomers, the cured elastomers have not had the high physical strength of peroxide cured elastomers because reinforcing fillers could not be employed therein. The reinforcing fillers converted the fluid RTV polymers to stiff, friable masses. Also, conventional RTV elastomer formulations containing reinforcing fillers could not be cured with the usual catalyst combinations.

It is an object of this invention to provide organopolysiloxane elastomer formulations which are not subject to the disadvantages mentioned hereinabove. A further object of this invention is to provide organopolysiloxane elastomer formulations which contain cationic and/or nonionic surfactants. A further object of this invention is to provide peroxide cured organopolysiloxane elastomers of improved tensile strength.

A still further object of this invention is to provide room temperature vulcanizable organopolysiloxane elastomer formulations which contain relatively large quantities of reinforcing fillers and which can be cured by conventional catalysts to elastomers having exceptionally high physical strength. These and other objects of the invention will be apparent from the following description and appended claims.

The organopolysiloxane elastomer formulations of this invention comprise: (1) an organopolysiloxane selected from the class consisting of a hydroxy end-blocked organopolysiloxane fluid convertible to a gum and an organopolysiloxane gum, (2) a reinforcing filler in an amount of from about 20 to 80 parts by weight per 100 parts by weight of organopolysiloxane, and (3) a cationic surfactant or a nonionic surfactant in a total amount between about 5 and about 40 parts per 100 parts by weight of organopolysiloxane. In addition, the elastomer formulations of this invention can contain nonreinforcing fillers, one or more curing catalysts, and diorganopolysiloxane fluid diluents. Since either a hydroxy end-blocked organopolysiloxane fluid which is convertible to a gum or an organopolysiloxane gum may be employed as the organopolysiloxane base material in the compositions of this invention. The term "gum" as used hereinafter in this specification is intended to include both convertible hydroxy end-blocked fluids and converted gums for the purpose of brevity.

The curable organopolysiloxane elastomer formulations of this invention are produced by admixing at room temperature or above (but below the curing temperature) the above-described ingredients until a uniform dispersion of the ingredients is obtained.

Suitable appaatus for preparing the curable organopolysiloxane elastomer formulations of this invention include milling rolls operating at differential speeds, internal mixers and the like. According to the milling technique, the organopolysiloxane gum is charged onto the roll mill and milled to give a uniform sheet. Next the surfactant is added and milling is continued to disperse the surfactant throughout the sheet of polysiloxane gum. The reinforcing filler is then added in suitable amounts and the milling continued until the filler is uniformly dispersed throughout hte organopolysiloxane gum. Other additives, for example, coloring agents are added and milling continued to obtain a uniform dispersion. If desired, a curing catalyst can be added at this point. The resulting curable elastomer formulation is usually a soft, grease-like compound in a semi-solid state.

The curable organopolysiloxane elastomer formulation may then be cured to an elastomer by conventional techniques, or a diorganopolysiloxane fluid may be added before curing to convert the curable elastomer formulation to a pourable material which is easier to handle and allows for the easier removal of air from said formulation prior to cure. From about 5 to 25 parts by weight of fluid per 100 parts by weight of organopolysiloxane gum may be employed. A typical fluid employed for the purpose of converting a curablfe elastomer formulation to a pourable material is a methyl end-blocked dimethylsiloxane fluid having a viscosity of from about 10 to about 1000 cps. The resulting formulations still have "yield points," which are characteristic of greases, but these formulations are no longer self-supporting and flow. Viscosities of the above described fluid from about 50 to about 200 cps. are preferred. The diorganopolysiloxane fluid should be added after the initial grease-like formulation has been formed.

The compositions of this invention can be cured by irradiation with an electron beam, or with gamma rays. Compositions in which the organopolysiloxane gum contains an average of two silicon-bonded hydroxy groups per polysiloxane molecule and which include as catalysts a tetraalkyl silicate (or polysilicate) and a metal salt of an aliphatic acid (such as lead octoate or dibutyltin dilaurate) are curable at room temperature. The formulations of this invention can also be cured to elastomers by adding thereto an organic peroxide and subsequently heating the resulting mixture to a temperature sufficiently elevated to cause the peroxide to decompose thereby curing the curable formulation to an elastomer.

The cured organopolysiloxane elastomers of this invention can be subjected to post-curing heat treatment. Such post-curing heat treatment is conducted at temperatures of at least about 350° F. and preferably at temperatures of about 480° F. for periods of about 24 hours in a heated circulating air oven. Such post-curing treatment serves to stabilize the physical properties of the elastomer and to improve the compression set characteristics thereof.

The organopolysiloxane gums used in this invention include both homopolymeric and copolymeric organopolysiloxanes. These organosiloxanes contain siloxane groups represented by the formula:

wherein R is hydrogen or a monovalent organic radical, such as a monovalent hydrocarbon radical, a halogenated monovalent hydrocarbon radical, a cyanoaryl group, a cyanoalkyl group wherein the cyano group is interconnected to the silicon atom through at least 2 carbon atoms and a nitroaryl group. The ratio of the organic groups to silicon atoms in the starting organopolysiloxane gum is from 1.95 to 2.05, and at least one R per silicon should be a radical other than hydrogen. Those organopolysiloxane gums which can be cured to elastomers at room temperature (RTV systems) contain an average of two silicon-bonded hydroxy groups per molecule. These hydroxy groups can replace R or R' groups, but preferably the hydroxy groups serve as end-blocking groups for the polymer chains.

Illustrative of the monovalent organic radicals that are represented by R are alkyl groups (for example, methyl, ethyl and propyl groups and the like); aryl groups (for example, phenyl, tolyl groups and the like); aralkyl groups (for example, benzyl and phenylethyl groups and the like); cycloalkyl groups (for example, cyclohexyl and cyclopentyl groups and the like); and the olefinically unsaturated monovalent hydrocarbon radicals such as alkenyl groups (for example, the vinyl and the allyl group) and the cycloalkenyl groups (for example, the cyclohexenyl group). The preferred monovalent olefinically unsaturated hydrocarbon group is the vinyl group.

Illustrative of the halogenated monovalent hydrocarbon radicals that are represented by R are chloromethyl, trichloromethyl, chloropropyl, chlorophenyl, bromophenyl, trifluoromethylphenyl and the like; their perfluoroalkyl groups such as 2-trifluoromethylpropyl, hexafluoroisohexyl, 3,3-trifluoropropyl, 5,5,5-trifluoro-2-(trifluoromethyl)amyl, 5,5,6,6,6-pentafluoro-2(perfluoroethyl)hexyl and the like.

Illustrative of the cyanoaryl groups that are represented by R are cyanophenyl groups such as para-cyanophenyl, ortho-cyanophenyl, meta-cyanophenyl and the like and bromocyanophenyl groups such as 2-bromo-2-cyanophenyl, 2,5-dibromo-4-cyanophenyl, bromo-2,4-dicyanophenyl groups and the like.

Illustrative of the nitroaryl groups that are represented by R are, for example, nitrophenyl, nitronaphthyl and the like.

Useful organopolysiloxane gums may contain siloxane groups wherein either the same organic groups are attached to the silicon atoms (e.g., the dimethylsiloxane, diphenylsiloxy and diethylsiloxy groups) or different organic groups are attached to the silicon atoms (e.g., the methylphenylsiloxy, phenylethylmethylsiloxy, ethylphenylsiloxy, methylvinylsiloxy and phenylvinylsiloxy groups).

When olefinically unsaturated monovalent hydrocarbon radicals are present in the organopolysiloxane gum, it is preferred that from 0.037 to 0.74 percent of the monovalent organic radicals be such olefinically unsaturated monovalent hydrocarbon radicals, although amounts of such radicals up to about 3.0 percent are frequently useful.

In producing the compositions of this invention, any of the filler materials of the highly-reinforcing type as exemplified by carbon blacks and certain inorganic compounds, or any suitable combination of such filler materials, can be employed in the production of organopolysiloxane elastomers in accordance with heretofore customary procedures. Of the inorganic fillers, it is preferred to employ finely-divided silica-base fillers of the highly-reinforcing type which are characterized by particle diameters of less than 500 millimicrons and by surface areas of greater than 50 square meters per gram. Inorganic filler materials of a composition, or of a particle diameter and surface area, other than those preferred, can be employed in combination with the preferred fillers with good results. By way of illustration, such filler materials as titania, iron oxide, and the like, are preferably employed in combination with highly-reinforcing silica fillers. Nonreinforcing fillers (extenders) can also be included in the compositions of this invention in amounts up to about 200 parts by weight per part of organopolysiloxane gum. Typical nonreinforcing fillers include diatomaceous silica, calcium carbonate, clays and ground quartz.

The organic and organosilicon surfactants (or surface active agents) which are useful in the formulations of this invention can be conveniently classified as non-ionic or cationic. These surface active agents are generally characterized structurally by an elongated nonpolar portion having but little affinity for water or water-soluble systems and a short polar portion possessing high affinity for water and water-soluble systems. The nonpolar portion is hydrophobic and the polar portion is hydrophilic.

If the elongated, nonpolar portion of the molecule is included in the cation in an aqueous solution, the surfactant is called cationic.

In the cationic class of surfactants useful in this invention, the cationic group is a quaternary ammonium group.

The nonionic surface active agents do not dissociate in water but nevertheless are characterized by a relatively polar portion and a relatively nonpolar portion.

Any cationic organic surfactant containing a quaternary ammonium group is operable in the present invention. It is preferably that the organic groups attached to the quaternary nitrogen contain a total of at least 15 carbon atoms. It is also preferable that the anion associated with the quaternary ammonium cation be chloride or other halogen anion, although other anions such as sulfate, nitrate, acetate, stearate, benzene-sulfonate and the like are also operable.

The cationic organic surfactants most preferred are those represented by the formula:

$$\left[ \begin{array}{c} CH_3 \\ | \\ R'-N-CH_3 \\ | \\ R' \end{array} \right]^+ Cl^-$$

wherein each R' is a monovalent hydrocarbon group free of aliphatic unsaturation and containing from at least 7 to about 24 carbon atoms.

The monovalent hydrocarbon group R' can be, for example, an alkyl, cycloalkyl, aryl or alkaryl group such as octyl, 2-ethylhexyl, decyl, 2-ethylcyclohexyl, betaphenyl, ethylbenzyl, dimethylbenzyl, ethyl, mesityl, cumyl, naphthyl, lauryl, myristyl, stearyl, tetracosyl, and the like.

Illustrative cationic organic surfactants useful in this invention are set forth in Table I. The carbon atom range given for the R' groups in Table I is the range generally found in commercially available materials.

TABLE I

| Surfactant | Formula | Nature of R' Group |
|---|---|---|
| A | $\left[ \begin{array}{c} CH_3 \\ \| \\ R'-N-CH_3 \\ \| \\ R' \end{array} \right]^+ Cl^-$ | Alkyl, 8 to 18 carbon atoms. |
| B | $\left[ \begin{array}{c} CH_3 \\ \| \\ R'-N-CH_3 \\ \| \\ R_1 \end{array} \right]^+ Cl^-$ | Alkyl, 16 to 18 carbon atoms. |
| C | $\left[ \begin{array}{c} CH_3 \\ \| \\ R'-N-CH_2- \end{array} \right.$ 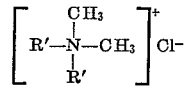 $\left. -C_2H_5 \atop \begin{array}{c} \| \\ CH_3 \end{array} \right]^+ Cl^-$ | Alkyl, 12 to 18 carbon atoms. |

TABLE I—Continued

| Surfactant | Formula | Nature of R' Group |
|---|---|---|
| D | $\left[\begin{array}{c}\text{CH}_3\\R'-N-CH_2-\phi-CH_3\\CH_3\quad\quad CH_2\end{array}\right]^+ Cl^-$ | Do. |
| E | $\left[\begin{array}{c}CH_3\\R'-N-CH_2-\phi\\CH_3\end{array}\right]^+ Cl^-$ | Do. |
| F | $\left[\begin{array}{c}CH_3\\R'-N-CH_3\\CH_3\end{array}\right]^+ Cl^-$ | Do. |
| G | $\left[\text{isoquinolinium-}N-R'\,,\,CH_3\right]^+ Cl^-$ | Alkyl, 14 to 16 carbon atoms. |
| H | $\left[\begin{array}{c}CH_2CH_2\quad CH_2CH_2OH\\N\\N=C\quad CH_2-\phi\\R'\end{array}\right]^+ Cl$ | Alkyl, 20 carbon atoms. |
| I | $\left[\begin{array}{c}CH_3\\R'-N-CH_3\\CH_3\end{array}\right]^+ (C_{17}H_{35}\overset{O}{\overset{\|}{C}}-O)^-$ | Alkyl, 16 carbon atoms. |

Any nonionic neutral surfactant can be used in the present invention. The term "neutral surfactant," as used herein, means that adding a substantial amount of the surfactant to water (or to an aqueous solution) does not change the pH of the water or solution by any significant amount.

The preferred nonionic neutral surfactants are those represented by the formula:

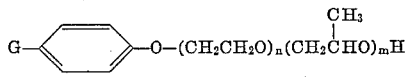

$$G-\phi-O-(CH_2CH_2O)_n(CH_2\overset{CH_3}{\overset{|}{C}}HO)_mH$$

wherein G is an alkyl group containing from 8 to 16 carbon atoms, such as octyl, nonyl, isodecyl, and hexadecyl; $n$ is an integer having a value from zero to about 100; $m$ in an integer having a value from zero to about 50, and the sum of $n$ and $m$ is from at least 4 to about 100.

Examples of nonionic neutral compounds of the above formula are:

TABLE II

| | |
|---|---|
| J | $C_9H_{19}-\phi-O-(CH_2CH_2O)_{49}H$ |
| K | $C_9H_{19}-\phi-O-(CH_2CH_2O)_4H$ |
| L | $C_{12}H_{25}-\phi-O-(CH_2O)_6H$ |
| M | $C_{16}H_{33}-\phi-O-(CH_2CH_2O)_{80}(CH_2\overset{CH_3}{\overset{|}{C}}HO)_{10}H$ | and the like.

Other nonionic neutral surfactants useful in this invention are polyoxyethylene lauryl alcohols ("BRIJ" compounds); polyoxyethylene sorbitan trioleates ("Tween" compounds), sorbitan monostearates ("Span" compounds), and polyoxyethylene stearates ("Myij" compounds).

The cationic organo-silicon surfactants useful in this invention are those polysiloxanes containing at least two units represented by Formual N and at least one unit represented by Formula O.

N $\quad\left[R_b''SiO_{\frac{4-b}{2}}\right]$

O $\quad\left[\begin{array}{c}Q\quad\quad R_c''\\|\quad\quad\;\;|\\CH_3N-C_dH_{2d}SiO_{\frac{3-c}{2}}\\|\\Q\end{array}\right]^+ [\text{Anion}]^-$ wherein R'' is a monovalent hydrocarbon group free of aliphatic unsaturation, Q is $-CH_3$ or $-CH_2OH$ $b$ is an integer having a value from 1 to 3, $c$ is an integer having a value from zero to 2, $d$ is an integer having a value from 3 to 6 and the nitrogen is separated from silicon by at least 3 carbon atoms of the $C_dH_{2d}$ group.

Preferably the organosilicon surfactants useful in this invention contain from 2 to about 4 units of Formula N and from 4 to about 50 units of Formula O.

The monovalent hydrocarbon group R'' preferably contains from one to about 10 carbon atoms, for example, an alkyl, cycloalkyl, aryl or alkaryl group such as methyl, ethyl, isobutyl, hexyl, 2-ethylhexyl, cyclopentyl, 2-ethylcyclohexyl, phenyl, tolyl, mesityl, cumyl, naphthyl, and the like.

Examples of the cationic organosilicon surfactants useful in this invention are those represented by the average formulas:

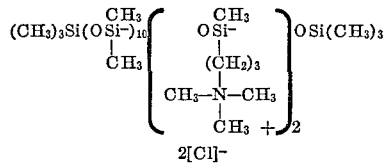

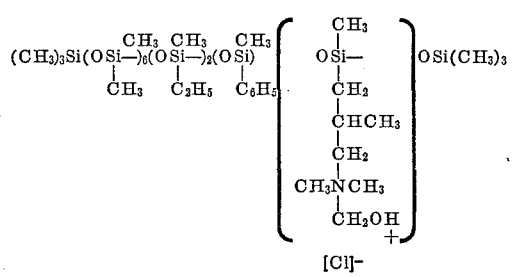

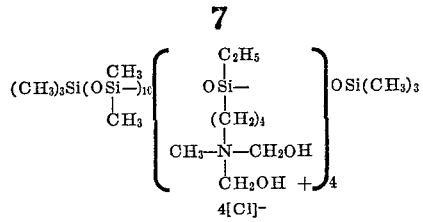

and the like.

The cationic organosilicon surfactants useful in this invention can be prepared by a process which comprises reacting an organosilicon compound containing the aminoalkyl silyl grouping

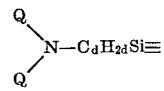

wherein Q and $d$ are as hereinbefore defined, with an alkyl halide to form a cationic organosilicon surfactant of the type hereinbefore described. Compounds of this type and processes for making said compounds are described in British Patent 882,053.

The catalysts that can be employed to cure the formulations of this invention to elastomers are any of the catalysts (curing agents) which have been heretofore employed in the production of organopolysiloxane elastomers. Thus, for example, the curing agent can be a room temperature curing agent, organic peroxide curing agent, gamma rays and electron beam irradiation.

Illustrative of the room temperature curing agents are mixtures of tetra-alkylsilicates, polysilicates or alkoxy-silanes with metal salts of aliphatic acids. Illustrative of the tetra-alkylsilicates are tetra-ethylisilicate, tetra-propylsilicate, tetra-butylsilicate and the like. Illustrative of the polysilicates are the products resulting from the partial hydrolysis of the aforementioned tetra-alkylsilicates. Illustrative of the alkoxysilanes are methyltriethoxysilane, vinyltriethoxysilane, gamma-glycidoxypropyltrimethoxysilane, methacrylatopropyltrimethoxysilane, bis-triethoxy-silylethane and the like. Illustrative of the metal salts of the aliphatic acids are the lead, tin and zinc octoates, undecanoates, octadecanoates, dilaurates and the like.

The amount of tetra-alkylsilicate, polysilicate or alkoxy-silane is not narrowly critical. In practice the amount of this ingredient may range from 0.5 part to 10 parts by weight per 100 parts by weight of the organopolysiloxane gum. The amount of metal salt of the aliphatic acid used as curing agent in this invention is not narrowly critical. In practice the amount of this ingredient may range from 0.1 part to 5.0 parts by weight per 100 parts by weight of the organo-polysiloxane gum.

Illustrative of the organic peroxide curing agents that can be employed to produce the elastomers of this invention are the dialkyl peroxides, the diacyl peroxides, the alkylacyl peroxides and the like. The dialkyl peroxides are, for example, di-tertarybutyl peroxide, tertiary-butyl-tri-ethylmethylperoxide, tertiary-butyl-tertiarytriptyl peroxides 2,5-dimethyl, 2,5-ditertiarybutyl peroxy hexane and the like and the substituted dialkyl peroxides such as dicumyl peroxide. The diacyl peroxides, are for example benzoyl peroxide, 2,4 - dichlorobenzoyl peroxide, 1,4 - dichlorobenzoyl peroxide monochlorobenzoyl peroxide and the like. The alkyl - acyl peroxides are, for example, tertiary-butyl perbenzoate, tertiary-butyl peracetate and the like. When carbon black is used as a reinforcing filler in the formulations of this invention, it is preferred that catalysts such as dicumyl peroxide and di-tertiary-butyl peroxide be employed for best results. When diacyl peroxides are employed as curing catalysts, the use of a non-ionic surfactant is preferred.

Also, when the surfactants of this invention are used in amounts greater than about 15 parts by weight per 100 parts by weight of organopolysiloxane gum, it is preferable to employ dialkyl peroxide curing catalysts.

The amount of the organic peroxide used as a curing agent in this invention is not narrowly critical. In practice the amount of the curing agent may be as little as 0.1 part by weight of the organopolysiloxane gum. When organopolysiloxane gums that cure through alkenyl groups are employed, the preferred amount of the peroxide curing agent is from 0.2 part to 3.0 parts by weight per 100 parts by weight of the gum. When organopolysiloxane gums that cure through other groups are employed, the preferred amount of the peroxide curing agent is from 1.5 parts to 5.0 parts by weight per 100 parts by weight of the gum. Greater or lesser amounts of the peroxides may be used but no commensurate advantage is gained thereby.

The following examples are presented. The Brabender plasticity values given in the examples were obtained by standard methods; the lower the value, the softer and more plastic is the material.

In the examples all parts are parts by weight and the abbreviations "cps." represents "centipoises."

EXAMPLE 1

One hundred parts by weight of hydroxy end-blocked dimethyl polysiloxane fluid containing less than 0.1 wt. percent hydroxyl groups and having a viscosity of 12,700 cps. were charged to a planetary mixer. To this was added slowly 60 parts of (nonreinforcing) diatomaceous silica and 1.0 parts by weight of partially condensed tetraethyl silicate. These ingredients were mixed to form a uniformly smooth, flowable, viscous compound. This is sistency. This is Compound C.

Another 100 parts by weight of the same hydroxy end-blocked dimethylpolysiloxane fluid as used in Compound A was charged to the mixer. To this were added 35 parts by weight of fine particle size fumed (reinforcing) silica, and 1.0 parts by weight of partially condensed tetra ethyl silicate. As this mixture was blended it formed a stiff, friable dimensionally stable mass, which did not flow. This is Compound B.

A third 100 parts by weight of the same hydroxy end-blocked dimethyl polysiloxane fluid were charged to the mixer. To this was added 9.0 parts by weight of Surfactant A of Table I. These two ingredients were blended together for 5 minutes. Then 35 parts by weight of fine particle size fumed (reinforcing) silica, and 1.0 parts by weight of partially condensed tetra ethyl silicate were added slowly to the mixture. After mixing for a few minutes, the resulting compound had a soft, grease-like consistency. This is Compound C.

To determine the relative consistency of the materials a sample of each compound was charged to the Brabender Plastograph. Using a rotor speed of 63 r.p.m., the Brabender plasticity was determined. To another sample of each compound was added 0.5 part by weight of dibutyltin dilaurate catalyst per 100 parts by weight of contained siloxane polymer. The catalyst was mixed into the compound using a spatula. A 6″ x 6″ x 0.075″ slab of each material was formed between Mylar sheets at room temperature using a standard ASTM slab mold.

After 24 hours at room temperature, the materials had become stiff enough to permit removal of the top Mylar sheet. After 48 hours, at room temperature, the physical properties of the slabs were tested. The results obtained along with the Brabender plasticity values are shown in the table below.

| | Brabender Plasticity, gm./m. | Properties of Room Temperature Cured Slabs | | |
|---|---|---|---|---|
| | | Hardness, Shore A | Tensile Strength, p.s.i. | Elongation, percent |
| Compound A | 78 | 61 | 560 | 140 |
| Compound B | 700 | 41 | (1) | (1) |
| Compound C | 64 | 44 | 860 | 670 |

[1] Little or no evidence of cure.

It is apparent from the above that the addition of the surfactant provided a method of incorporating reinforcing silica in the hydroxy end-blocked polysiloxane fluid to form a soft, grease-like material. The above data also show that the surfactant makes possible the cure of the compound using conventional cross-linkers and catalyst. Finally, it shows that the physical properties obtained by incorporation of reinforcing silica with the aid of the surfactant are significantly higher than those characteristic of conventional RTV polysiloxane elastomers.

EXAMPLE 2

One hundred parts by weight of hydroxy end-blocked dimethyl polysiloxane fluid containing less than 0.1 wt. percent hydroxy groups and having a viscosity of 12,700 cps. were charged to the planetary mixer. To this was added 10 parts by weight of Surfactant A of Table I and 1.0 parts of partially condensed tetra ethyl silicate. These three ingredients were blended 5 minutes and then 40 parts by weight of reinforcing silica filler were slowly added. After additional mixing, a soft, grease-like compound having a Brabender plasticity of 56 gm.-m. was obtained.

After three days, an additional 1.0 parts by weight of partially condensed tetra ethyl silicate and 2.0 parts by weight of dibutyltindilaurate were added per 100 parts by weight of contained siloxane polymer. These ingredients were mixed with the original compound using a spatula.

A 6″ x 6″ x 0.075″ ASTM slab of this material was formed between Mylar sheets at room temperature. After 24 hours, the top Mylar sheet was removed and after 72 hours at room temperature, the physical properties of the room temperature cured rubber were measured. The results are shown below.

Durometer (Shore A) _____ 48
Tensile Strength (p.s.i.) _____ 1250
Elongation (percent) _____ 760

EXAMPLE 3

One hundred parts by weight of hydroxy end-blocked dimethyl polysiloxane fluid were charged to a 6″ x 12″ two-roll rubber mill having a friction ratio of 3.0 to 1. The rolls of the mill had previously been heated to about 130° F. To this was added 11.5 parts by weight of Surfactant D of Table I and 2.0 parts by weight partially condensed tetra ethyl silicate. These three ingredients were mixed together on the roll mill and then 40 parts by weight reinforcing silica filler were slowly added. This ingredient was mixed in for several minutes producing a soft, grease-like compound having a Brabender plasticity of 159 gm.-m.

A sample of this compound was catalyzed with 2.0 parts by weight of dibutyl tin dilaurate per 100 parts of contained siloxane polymer. This catalyzed sample was formed into a 6″ x 6″ x 0.075″ slab using the procedure described in Examples 1 and 2. After curing for 72 hours at room temperature, the physical properties of the slab were tested with the following results:

Durometer (Shore A) _____ 55
Tensile Strength (p.s.i.) _____ 1650
Elongation (percent) _____ 340

EXAMPLE 4

To 75 parts by weight hydroxy endblocked dimethylpolysiloxane fluid, 2.0 parts by weight of ethyl silicate were added and blended on a 6″ x 12″, 2-roll rubber mill. The rolls of the mill had previously been heated by hot water to 130° F. After blending in the mill a few minutes, 40 parts by weight of reinforcing silica filler and 10 parts by weight of Surfactant J of Table II were added incrementally and simultaneously to the polysiloxane-silicate mixture. At this point, the mixture was a relatively stiff paste, to which 25 parts by weight additional hydroxy end-blocked dimethyl polysiloxane fluid were added. This converted the relatively stiff paste to a soft, grease-like consistency. The Brabender Plasticity of this material was measured. This is Sample D.

A second 75 parts by weight of the same hydroxy endblocked dimethylpolysiloxane fluid used above were blended with 2.0 parts by weight partially condensed tetra ethyl silicate on a 6″ x 12″, 2-roll mill. After milling, a few minutes 40 parts by weight reinforcing silica filler and 10 parts by weight Surfactant K of Table II were blended with the polymer by simultaneous incremental addition. To the relatively stiff paste which resulted, were added 25 parts by weight additional hydroxy endblocked dimethylpolysiloxane fluid, a soft, grease-like compound was obtained. Brabender plasticity was measured. This is Sample E.

A third 75 parts by weight of the same hydroxy endblocked dimethylpolysiloxane fluid and 2.0 parts by weight partially condensed tetraethyl silicate were blended on the 2-roll mill. To this 40 parts by weight reinforcing silica filler and 10 parts by weight Surfactant L of Table II were added using the simultaneous incremental addition technique described above. A relatively stiff paste resulted. To this paste were added 25 parts by weight additional hydroxy endblocked dimethylpolysiloxane fluid to produce a soft, grease-like compound. Brabender Plasticity was measured. This is Sample F.

Samples of each of these materials were catalyzed on the roll mill by adding 2.0 parts by weight dibutyltindilaurate per 100 parts by weight siloxane polymer. A 6″ x 6″ x 0.075″ ASTM slab of each material was formed using the technique described in Examples 1 and 2. After curing at room temperature for 72 hours, physical properties of the slab were measured. The results obtained, together with the Brabender Plasticities measured previously, are presented in table below.

|  | Sample D | Sample E | Sample F |
| --- | --- | --- | --- |
| Brabender Plasticity (gm./m.) | 250 | 190 | 220 |
| Properties of Slabs after 72 hrs. at Room Temperature: |  |  |  |
| Durometer (Shore A) | 61 | 42 | 29 |
| Tensile Strength (p.s.i.) | 1,190 | 980 | 1,150 |
| Elongation (percent) | 320 | 560 | 540 |
| Tear Strength (Die B) (lbs./in.) |  | 180 |  |

This example further demonstrates that surfactants can be used to achieve a soft, grease-like RTV elastomer formulation containing reinforcing filler and that a good cure and physical properties can be obtained. Of particular note is the high tear strength, the above value being 4 to 6 times as great as the values for comparable elastomers which do not contain surfactant.

EXAMPLE 5

One hundred parts by weight hydroxy endblocked dimethylpolysiloxane fluid were blended on the roll mill witth 2.0 parts by weight partially condensed tetra ethyl silicate and 19 parts by weight of a cationic organo-silica surfactant having the following average formula:

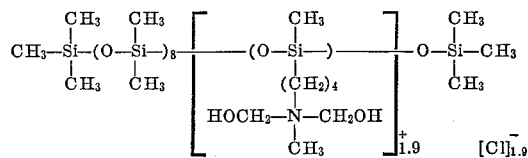

Mixing was accomplished on a roll mill as described in Example 3. Forty parts by weight reinforcing filler were added slowly to the mixture on the roll mill. A soft, grease-like compound resulted. The Brabender Plasticity of this material was 162 gm.-cm.

A sample of this material was catalyzed on the roll mill by mixing in 2.0 parts dibutyltindilaurate per 100 parts of siloxane polymer. A 6″ x 6″ x 0.075″ slab was formed using the technique described in Examples 1 and 2. After curing 72 hours at room temperature, the physical properties of the slab were measured. The results are shown below.

Durometer (Shore A) _____ 52
Tensile Strength (p.s.i.) _____ 1140
Elongation (percent) _____ 620

EXAMPLE 6

Seventy five parts by weight of 12,000 cps. viscosity hydroxy endblocked dimethyl polysiloxane fluid were blended on a 6″ x 12″ two-roll rubber mill. To this were added 40 parts by weight reinforcing silica filler and 15 parts by weight Surfactant D of Table I. These ingredients were added using the simultaneous incremental addition described in Example 4 above. Finally, 25 parts by weight additional hydroxy endblocked dimethylpolysiloxane fluid were added to produce a soft, grease-like compound. At this point, the material had a definite "yield point" and would not flow under its own weight although it could be spread easily with a spatula.

One hundred parts by weight of the above material was returned to the roll mill and 10 parts by weight methyl endblocked dimethyl polysiloxane fluid of 100 cps. viscosity were added. This addition converted the material from soft grease to a pourable fluid. This fluid compound had a viscosity of 114,000 cps. using a Brookfield Viscometer with Spindle No. 7 and a speed of 20 r.p.m. The Brabender Plasticity of this material was 76 gm.-m.

To a sample of this pourable material (on the roll mill) were added 2.0 parts by weight gamma-glycidoxypropyltrimethoxy silane as crosslinker. The sample was catalyzed on the roll mill using 2.0 parts by weight dibutyltindilaurate per 100 parts by weight of the hydroxy-endblocked dimethylpolysiloxane fluid contained therein. A 6″ x 6″ x 0.075″ Standard ASTM slab of this compound was formed using the technique previously described. After curing at room temperature for 144 hours, this material had the following physical properties:

Durometer (Shore A) _____ 32
Tensile strength (p.s.i.) _____ 1180
Elongation (percent) _____ 780
Tear strength (Die B) (lbs./in.) _____ 140

EXAMPLE 7

On a two-roll laboratory rubber mill 40 parts by weight of reinforcing silica filler were added incrementally to 100 parts by weight of a dimethylpolysiloxane gum containing 0.345 mole percent methylvinyl siloxy units. The mixture was milled until a transparent, plastic sheet of silica filled elastomer formulation was obtained. This is Sample G.

To another 100 parts by weight of the same polysiloxane gum were added incrementally, 40 parts by weight reinforcing silica filler and 16 parts by weight of an ethoxy endblocked dimethylpolysiloxane fluid. These two ingredients were added to the gum simultaneously on the two-roll rubber mill. These materials were mixed into the gum until a uniform, transparent plastic sheet of elastomer formulation was produced. This is Sample H.

A third 100 parts by weight sample of the same polysiloxane gum was milled on the two-roll rubber mill. To this were added 10 parts by weight of Surfactant A of Table I. These two ingredients were intimately mixed on the roll mill for several minutes. Then 40 parts by weight reinforcing silica filler were added incrementally. this mixture was milled until a smooth, plastic transparent sheet of elastomer formulation was produced. This is Sample I.

A fourth formulation, Sample J, was produced using the same procedure as that used for Sample I except that 15 parts by weight of Surfactant D of Table I were added in place of 10 parts by weight of Surfactant A of Table I.

Each of these four samples was stored at room temperature for 7 days to permit time for the formation of a crepe-hardened structure. After this period each sample was returned to the two-roll rubber mill for replasticization. The time necessary to replasticize the sample is a measure of the degree of crepe-hardening and is generally referred to as "remill time." The remill times for these four samples are shown in the table below.

Remill time (in seconds)
Sample G _____ 780
Sample H _____ 0
Sample I _____ 20
Sample J _____ 10

These results show that the addition of surfactants can produce resistance to crepe-hardening essentially equivalent to that obtained with organopolysiloxane crepe-hardening inhibitors.

After remilling, each sample was catalyzed with 0.8 part by weight ditert-butyl peroxide per 100 parts by weight of polysiloxane gum. This addition was also effected on the two-roll rubber mill.

Following this, three 6″ x 6″ x 0.075″ Standard ASTM slabs of each sample were cured in a closed mold for a period of 15 minutes at 340° F. A good cure of the rubber resulted.

The physical properties of one of the slabs were tested after storage at room temperature for 24 hours. Another slab was oven aged for a period of 4 hours at 350° F. and the third slab was oven aged 24 hours 520° F. Physical properties on these last two slabs were also measured. The results of all these physical property tests are shown in the table below:

| Properties After Mold Cure (Room Temp. Aging) | Sample G | Sample H | Sample I | Sample J |
|---|---|---|---|---|
| Durometer (Shore A) | 57 | 50 | 56 | 46 |
| Tensile Strength (p.s.i.) | 1,060 | 1,160 | 1,090 | 1,390 |
| Elongation (percent) | 160 | 330 | 410 | 680 |
| Tear Strength (Die B) (lbs./in.) | 30 | 50 | 120 | 140 |
| Properties After 4 Hours at 350° F.: | | | | |
| Durometer (Shore A) | 59 | 52 | 63 | 66 |
| Tensile Strength (p.s.i.) | 1,180 | 1,000 | 1,150 | 1,450 |
| Elongation (percent) | 160 | 280 | 250 | 330 |
| Tear Strength (Die B) (lbs./in.) | 30 | 60 | 60 | 80 |
| Properties After 24 Hours at 520° F.: | | | | |
| Durometer (Shore A) | (1) | (1) | 74 | 69 |
| Tensile Strength (p.s.i.) | (1) | (1) | 490 | 850 |
| Elongation (percent) | (1) | (1) | 70 | 200 |
| Tear Strength (Die B) (lbs./in.) | (1) | (1) | 50 | 50 |

1 Too brittle to test.

What is claimed is:

1. An organosiloxane elastomer formulation curable to a polysiloxane elastomer which comprises: (1) an organopolysiloxane selected from the class consisting of a hydroxy end-blocked organopolysiloxane fluid convertible to a gum and an organopolysiloxane gum, (2) from 20 to 80 parts by weight of a reinforcing filler per 100 parts by weight of said organopolysiloxane, and (3) from 5 to 40 parts by weight per 100 parts by weight of said organopolysiloxane of a surfactant selected from the class consisting of (a) cationic organic surfactants free of aliphatic unsaturation and free from silicon atoms and containing a quaternary ammonium group and, (b)

cationic organosilicon surfactants free of aliphatic unsaturation and containing a quaternary ammonium group.

2. An organosiloxane elastomer formulation which is curable to a polysiloxane elastomer which comprises:
(1) an organopolysiloxane selected from the class consisting of hydroxy end-blocked organopolysiloxane fluids convertible to gums and siloxane gums having an average of about two silicon-bonded hydroxy groups per molecule;
(2) from 20 to 80 parts by weight of a reinforcing filler per 100 parts by weight of said organopolysiloxane; and
(3) from 5 to 40 parts by weight per 100 parts by weight of said organopolysiloxane of a surfactant selected from the class consisting of:
(a) cationic organic surfactants represented by the formula:

wherein R is a monovalent hydrocarbon group free of aliphatic unsaturation which contains from 7 to about 24 carbon atoms;
(b) nonionic neutral organic surfactants represented by the formula:

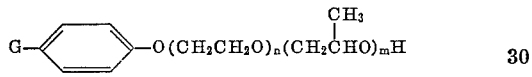

wherein G is an alkyl group containing from 8 to about 16 carbon atoms, $n$ is an integer having a value of from zero to about 100, $m$ is an integer having a value of from 0 to 50, and the sum of $n$ and $m$ is from 4 to about 100; and
(c) cationic polysiloxane surfactants which comprise at least one unit represented by the formula:

and at least one unit represented by the formula:

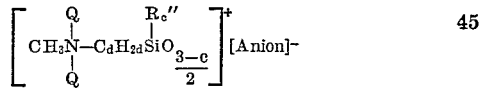

wherein R'' is a monovalent hydrocarbon group free of aliphatic unsaturation which contains from 1 to 10 carbon atoms, Q is selected from the class consisting of $CH_3$ and $-CH_2OH$, $b$ is an integer having a value of from 1 to 3, $c$ is an integer having a value of from 0 to 2, $d$ is an integer having a value of from 3 to 6, the nitrogen atom which is present in said group is separated from the silicon atom by at least 3 carbon atoms of the $C_dH_{2d}$ group, and the anion is selected from the group consisting of halogen, sulfate, nitrate, acetate, stearate, and benzenesulfonate.

3. An organosiloxane elastomer formulation which is curable to a polysiloxane elastomer which comprises:
(1) an organopolysiloxane selected from the class consisting of hydroxy end-blocked organopolysiloxane fluids which are convertible to gums and organopolysiloxane gums containing not more than 3 mole percent of olefinically unsaturated monovalent hydrocarbon radicals;
(2) from 20 to 80 parts by weight of a reinforcing filler per 100 parts by weight of said organopolysiloxane; and
(3) from 5 to 40 parts by weight per 100 parts by weight of said organopolysiloxane of a surfactant selected from the class consisting of:

(a) cationic organic surfactants represented by the formula:

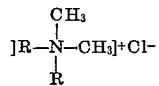

wherein R is a monovalent hydrocarbon group free of aliphatic unsaturation which contains from 7 to about 24 carbon atoms;
(b) nonionic neutral organic surfactants represented by the formula:

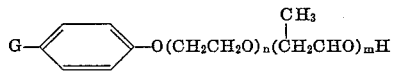

wherein G is an alkyl group containing from 8 to about 16 carbon atoms, $n$ is an integer having a value of from zero to about 100, $m$ is an integer having a value of from 0 to 50, and the sum of $n$ and $m$ is from 4 to about 100; and
(c) cationic polysiloxane surfactants which comprise at least one unit represented by the formula:

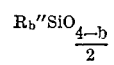

and at least two units represented by the formula:

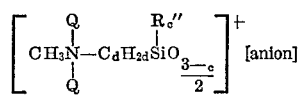

wherein R'' is a monovalent hydrocarbon group free of aliphatic unsaturation which contains from 1 to 10 carbon atoms, Q is selected from the class consisting of $CH_3$ and $-CH_2OH$, $b$ is an integer having a value of from 1 to 3, $c$ is an integer having a value of from 0 to 2, $d$ is an integer having a value of from 3 to 6, the nitrogen atom which is present in said group is separated from the silicon atoms by at least 3 carbon atoms of the $C_dH_{2d}$ group, and the anion is selected from the group consisting of halogen, sulfate, nitrate, acetate, stearate, and benzenesulfonate.

4. An organopolysiloxane elastomer formulation which is curable to a polysiloxane elastomer which comprises:
(1) an organopolysiloxane selected from the class consisting of hydroxy endblocked organopolysiloxane fluids which are convertible to gums and organopolysiloxane gums;
(2) from 20 to 30 parts by weight of fumed silica per 100 parts by weight of said organopolysiloxane; and
(3) from 5 to 40 parts by weight per 100 parts by weight of said organopolysiloxane of a surfactant selected from the class consisting of:
(a) cationic organic surfactants represented by the formula:

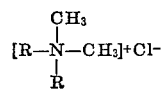

wherein R is a monovalent hydrocarbon group free of aliphatic unsaturation which contains from 7 to about 24 carbon atoms;
(b) a nonionic neutral organic surfactant having the formula:

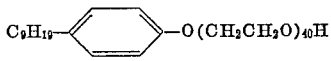

(c) a nonionic neutral organic surfactant having the formula:

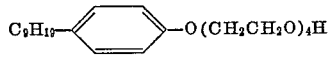

and (d) a nonionic neutral organic surfactant having the formula:

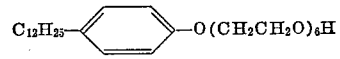

5. An organopolysiloxane elastomer which comprises the cured product of a composition comprising a formulation as defined in claim 4, from about 1.5 to about 5.0 parts by weight per 100 parts by weight of the organopolysiloxane present in said formulation of partially condensed tetra ethyl silicate, and from about 0.5 to about 4.0 parts by weight per 100 parts by weight of the organopolysiloxane present in said formulation of dibutyl tin dilaurate.

6. An organosiloxane elastomer formulation curable to a polysiloxane elastomer which comprises:
(1) an organopolysiloxane selected from the class consisting of hydroxy end-blocked organopolysiloxane fluids convertible to gums and siloxane gums having an average of about two silicon-bonded hydroxy groups per molecule;
(2) from 20 to 80 parts by weight of a reinforcing filler per 100 parts by weight of said organopolysiloxane; and
(3) from 5 to 40 parts by weight per 100 parts by weight of said organopolysiloxane of a surfactant selected from the class consisting of:
(a) cationic organic surfactants represented by the formula:

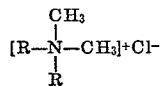

wherein R is a monovalent hydrocarbon group free of aliphatic unsaturation which contains from 7 to about 24 carbon atoms;
(b) nonionic neutral organic surfactants represented by the formula:

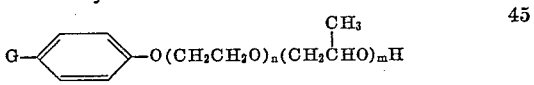

wherein G is an alkyl group containing from 8 to about 16 carbon atoms, $n$ is an integer having a value of from zero to about 100, $m$ is an integer having a value of from 0 to 50, and the sum of $n$ and $m$ is from 4 to about 100; and
(c) cationic polysiloxane surfactants which comprise at least one unit represented by the formula:

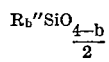

and at least one unit represented by the formula:

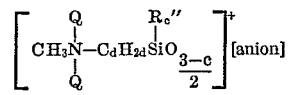

wherein R" is a monovalent hydrocarbon group free of aliphatic unsaturation which contains from 1 to 10 carbon atoms, Q is selected from the class consisting of $CH_3$ and $-CH_2OH$, $b$ is an integer having a value of from 1 to 3, $c$ is an integer having a value of from 0 to 2, $d$ is an integer having a value of from 3 to 6, the nitrogen atom which is present in said group is separated from the silicon atom by at least 3 carbon atoms of the $C_dH_{2d}$ group, and the anion is selected from the group consisting of halogen, sulfate, nitrate, acetate, stearate, and benzenesulfonate, and, as an additional component, from about 5 to about 25 parts by weight per 100 parts by weight of the organopolysiloxane present in said formulation of a methyl end-blocked dimethylsiloxane fluid as a diluent.

7. An organosiloxane elastomer formulation curable to a polysiloxane elastomer which comprises:
(1) an organopolysiloxane selected from the class consisting of hydroxy end-blocked organopolysiloxane fluids which are convertible to gums and organopolysiloxane gums;
(2) from 20 to 30 parts by weight of fumed silica per 100 parts by weight of said organopolysiloxane; and
(3) from 5 to 40 parts by weight per 100 parts by weight of said organopolysiloxane of a surfactant selected from the class consisting of:
(a) cationic organic surfactants represented by the formula:

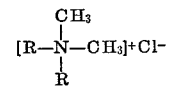

wherein R is a monovalent hydrocarbon group free of aliphatic unsaturation which contains from 7 to about 24 carbon atoms;
(b) a nonionic neutral organic surfactant having the formula:

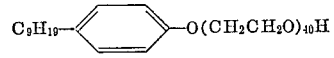

(c) a nonionic neutral organic surfactant having the formula:

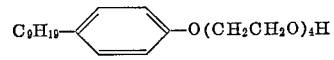

(d) a nonionic neutral organic surfactant having the formula:

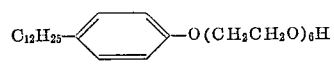

and, as an additional component, from about 5 to about 25 parts by weight per 100 parts by weight of the organopolysiloxane present in said formulation of a methyl end-blocked dimethylsiloxane having a viscosity of from about 50 centipoise to about 200 centipoise.

8. An organopolysiloxane elastomer which comprises the cured product of a composition comprising a formulation as claimed in claim 7, from about 1.5 to about 5.0 parts by weight per 100 parts by weight of the organopolysiloxane present in said formulation of partially condensed tetra ethyl silicate, and from about 0.5 to about 4.0 parts by weight per 100 parts by weight of the organopolysiloxane present in said formulation of dibutyl tin dilaurate.

References Cited
UNITED STATES PATENTS

| | | | |
|---|---|---|---|
| 3,127,363 | 3/1964 | Nitzsche et al. | 260—18 |
| 3,093,511 | 7/1963 | Weisel et al. | 260—37 |
| 2,881,146 | 4/1959 | Remer et al. | 260—37 |
| 2,744,079 | 5/1956 | Kilbourne et al. | 260—29.1 |

DONALD E. CZAJA, *Primary Examiner.*

LEON J. BERCOVITZ, *Examiner.*

C. W. IVY, *Assistant Examiner.*